US011331665B2

(12) United States Patent
Prakash et al.

(10) Patent No.: US 11,331,665 B2
(45) Date of Patent: May 17, 2022

(54) PAPERFUGE: AN INTEGRATED PAPER-BASED CENTRIFUGATION AND MICROFLUIDICS PLATFORM FOR LOW-COST DIAGNOSTICS

(71) Applicant: The Board of Trustees of the Leland Stanford Junior University, Palo Alto, CA (US)

(72) Inventors: Manu Prakash, San Francisco, CA (US); Mohammed Saad Bhamla, Stanford, CA (US); James Stanley Cybulski, Stanford, CA (US); Chew Chai, San Francisco, CA (US); Aanchal Johri, Rockville, MD (US); Brandon Benson, Janesville, WI (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 459 days.

(21) Appl. No.: 16/070,723

(22) PCT Filed: Jan. 9, 2017

(86) PCT No.: PCT/US2017/012667
§ 371 (c)(1),
(2) Date: Jul. 17, 2018

(87) PCT Pub. No.: WO2017/127248
PCT Pub. Date: Jul. 27, 2017

(65) Prior Publication Data
US 2019/0022642 A1    Jan. 24, 2019

Related U.S. Application Data

(60) Provisional application No. 62/320,325, filed on Apr. 8, 2016, provisional application No. 62/279,915, filed on Jan. 18, 2016.

(51) Int. Cl.
*B01L 3/00* (2006.01)
*B04B 5/04* (2006.01)
(Continued)

(52) U.S. Cl.
CPC .......... *B01L 3/50273* (2013.01); *B01L 9/065* (2013.01); *B04B 5/04* (2013.01); *B04B 5/0414* (2013.01);
(Continued)

(58) Field of Classification Search
CPC ............. B01L 3/50273; B01L 9/065; B01L 2300/0803; B01L 2300/0838;
(Continued)

(56) References Cited

U.S. PATENT DOCUMENTS 603,589 A    5/1898 Meissner
3,567,113 A    3/1971 Stansell
(Continued)

FOREIGN PATENT DOCUMENTS

WO    WO-2015131662 A1 *    9/2015    ........... C12Q 1/6869

*Primary Examiner* — Benjamin R Whatley
*Assistant Examiner* — Jean Caraballo-Leon
(74) *Attorney, Agent, or Firm* — Lumen Patent Firm (57) ABSTRACT

A microfluidic centrifuge is provided that includes a microfluidic disc having a pair of through holes that include a first through hole and a second through hole, where the pair of through holes are disposed symmetric and proximal to a central axis of the microfluidics disc, where the microfluidics disc includes a sealable input port and a sealable output port, where the sealable input port and the sealable output port are connected by a microfluidics channel, and a pair of tethers disposed through the pair of through holes that are disposed to twist about each other for unwinding where the tether unwinding is disposed to interact with the through holes, where the microfluidics disc rotates about the central axis.

11 Claims, 5 Drawing Sheets

(51) Int. Cl.
*B01L 9/06* (2006.01)
*B04B 9/00* (2006.01)
*G01N 21/07* (2006.01)
*G01N 21/03* (2006.01)

(52) U.S. Cl.
CPC ......... *B04B 9/00* (2013.01); *B01L 2300/0803* (2013.01); *B01L 2300/0838* (2013.01); *B01L 2300/126* (2013.01); *B01L 2400/0409* (2013.01); *G01N 21/07* (2013.01); *G01N 2021/0325* (2013.01)

(58) Field of Classification Search
CPC ....... B01L 2300/126; B01L 2400/0409; B04B 5/04; B04B 5/0414; B04B 9/00; G01N 21/07; G01N 2021/0325
See application file for complete search history.

(56) References Cited

U.S. PATENT DOCUMENTS

| | | | |
|---|---|---|---|
| 6,063,589 A * | 5/2000 | Kellogg | B01F 13/0059 366/DIG. 3 |
| 6,527,432 B2 | 3/2003 | Kellogg | |
| 6,776,680 B2 | 6/2004 | Chow | |
| 2006/0177936 A1* | 8/2006 | Shneider | B04B 5/0414 436/45 |
| 2008/0138890 A1 | 6/2008 | Horiike | |
| 2010/0203801 A1 | 8/2010 | Chan | |
| 2013/0266956 A1* | 10/2013 | Tia | G01N 33/54366 435/7.1 |
| 2015/0037481 A1* | 2/2015 | Krumpe | A23L 15/00 426/519 |

\* cited by examiner

PAPERFUGE: AN INTEGRATED PAPER-BASED CENTRIFUGATION AND MICROFLUIDICS PLATFORM FOR LOW-COST DIAGNOSTICS

CROSS-REFERENCE TO RELATED APPLICATIONS

This application is a 371 of PCT application PCT/US2017/012667 filed Jan. 9, 2017. PCT application PCT/US2017/012667 claims the benefit of U.S. Provisional application 62/279,915 filed Jan. 18, 2016.

FIELD OF THE INVENTION

The present invention relates generally to centrifuges. More particularly, the invention relates to a human-powered centrifuge that is capable of rapidly separating plasma from patient blood samples.

BACKGROUND OF THE INVENTION

A centrifuge is the workhorse of any medical diagnostics facility. From the extraction of plasma from whole blood (for performing immunoassays or determining the haematocrit value), to analyzing the concentration of pathogens and parasites in biological fluids, such as blood, urine and stool (for microscopy), centrifugation is the first key-step for most diagnostic assays. In modern diagnostics, separation of unwanted cellular debris is especially critical for the accuracy and reliability of molecular diagnostics tools and lateral-flow-based rapid diagnostic tests that are designed for detecting low levels of infection in diseases such as malaria, human immunodeficiency virus and tuberculosis. Currently, centrifugation is typically inaccessible under field conditions, because conventional machines are bulky, expensive and electricity-powered. The need for electricity-free centrifugal bio-separation solutions has prompted researchers to use egg-beaters and salad-spinners as proposed devices. However, these suffer from bulky designs and extremely low rotational speeds (maximum 1,200 r.p.m.; 300 g), leading to impractical centrifugation times for a simple task of blood plasma separation (>10 min).

What is needed is a low-cost, human-powered centrifuge that achieves high speeds and is portable, light-weight, and disposable in low resource settings.

SUMMARY OF THE INVENTION

To address the needs in the art, a microfluidic centrifuge is provided that includes a microfluidic disc having a pair of through holes that include a first through hole and a second through hole, where the pair of through holes are disposed symmetric and proximal to a central axis of the microfluidics disc, where the microfluidics disc includes a sealable input port and a sealable output port, where the sealable input port and the sealable output port are connected by a microfluidics channel.

According to one aspect of the invention, the microfluidics disc includes a housing material that includes paper, polymethyl methacrylate, polydimethylsiloxane, or plastic.

In another aspect of the invention, the microfluidic centrifuge further includes a first tether and a second tether forming a pair of tethers, where the pair of tethers are disposed through the pair of through holes, where the pair of tethers are disposed to twist about each other for unwinding, where the tether unwinding is disposed to interact with the through holes, where the microfluidics disc rotates about the central axis.

According to a further aspect of the invention, the sealable input port is disposed proximal to the central axis and the sealable output port disposed proximal to a perimeter of the microfluidics disc, where the microfluidics channel is a linear-shape or a non-linear shape.

In yet another aspect of the invention, the sealable input port is disposed proximal to the central axis and the sealable output port disposed proximal to the central axis forming a U-shape microfluidics channel.

According to one aspect of the invention, the microfluidics channel includes a coating of an assay reagent.

In a further aspect of the invention, a central region of the microfluidics disc includes a heat source.

In one aspect of the invention, the perimeter of the microfluidics includes a reagent for visual analysis.

In a further aspect of the invention, the microfluidic disk includes a sealable capillary holder, where a capillary is configured for inserting into the sealable capillary holders.

According to one aspect, the sealable holder includes a pocket for mounting the capillary, where the capillary is plastic or glass. In another aspect, the sealable holder includes a pocket for mounting an Eppendorf tube. In a further aspect, the sealable holder includes a window for direct imaging by a microscope.

According to one aspect of the invention, the input port and the output port include resealable ports configured for adding or subtracting samples in multi-step processes.

In a further aspect of the invention, the microfluidics disk includes valves and pre-coated chemicals for further processing.

DETAILED DESCRIPTION

The current invention provides a pure mechanical centrifuge device that operates entirely on human power. According to the invention, high-rotational speeds that match or surpass commercial centrifuge hardware is enabled. The invention is capable of separating plasma from blood in less than 2 minutes, which is less than half the time (5 minutes) required by a commercial electricity-powered centrifuge. The current invention is a relatively low complexity device that requires almost no-training. The invention can be operated by health-volunteers or patients themselves with minimal user-fatigue. A paper-based design allows extremely easy disposal of contaminated samples and the centrifuge by incineration. A modular design makes it very attractive for large-scale production, where billions of units can be at very low-cost. Further, the current invention allows for integrated paper-based microfluidics, resulting in an integrated centrifugation and paper-microfluidics platform. This opens up innovations in one-step diagnostics, which combine sample preparation, microfluidics and diagnostics, into one single step, all without using electricity.

In one aspect, the invention costs as low as 20 cents, with a size similar to that of a DVD disc, weighs about 1 gram, delivers in excess of 10,000 g forces at 20,000 revolutions per minute (rpm), and is constructed out of paper.

In one embodiment, the centrifuge includes a paper-based disc, with circular holes, integrated microfluidics, and holes for a string/cord to pass through. The paper base has special provisions for mounting of patient specimen samples (including blood, urine, stool, etc.) either in a plastic tube or other microfluidics slides. In one embodiment, the invention enables multiple samples to be filled simultaneously. The device is operated by pulling rapidly on the cord passing through the paper-base, which causes the base to spin at extremely high-speeds. In one example embodiment the device has achieved greater than 50,000 RPM, which costs less than 20 cents to make, where up to 75,000 RPM is possible.

In one embodiment, this invention can be used for centrifugation of biological samples (blood, urine etc.) for medical assays and point-of-care disease diagnostics. In another embodiment, it can be used as a complete "centrifugal microfluidics" platform with centrifugal forces provided by the invention. In this case, the entire centrifuge is disposable and hence can be used for infectious samples.

Other existing human-powered devices such as hand-crank, bike, egg-beater or salad-spinner inspired centrifuges are limited to maximum 3000 rpm speeds, which leads to spinning times of tens of minutes. Finally, none of the other devices are paper-based, which opens up a large number of advantages that include integration of paper-microfluidics, easy-disposal, print-manufacture, and paper-based immuno-assays. Integration of microfluidics with centrifugation and integrated processing is only possible in this form factor.

Until now, there has not been a cheaper, paper-based centrifugation device, which enables centrifugation of blood samples in short durations, without using electricity. This invention allows a wide range of paper-based microfluidics and diagnostics assays for disease-diagnostics.

The current invention is an ultralow-cost, lightweight (2 g), field-portable centrifuge, henceforth referred to as a 'paperfuge'. The paperfuge achieves speeds of 125,000 r.p.m. (30,000 g) using only human power. Using a combination of modeling and experimental validation, the detailed mechanics of the paperfuge are described here in and exemplary embodiments of different centrifuges from different materials (in particular, paper and plastic) are presented. Applications are demonstrated that including plasma separation, quantitative buffy coat analysis (QBC) and integrated centrifugal microfluidic devices for point-of-care (POC) diagnostic testing.

Figure 1A:
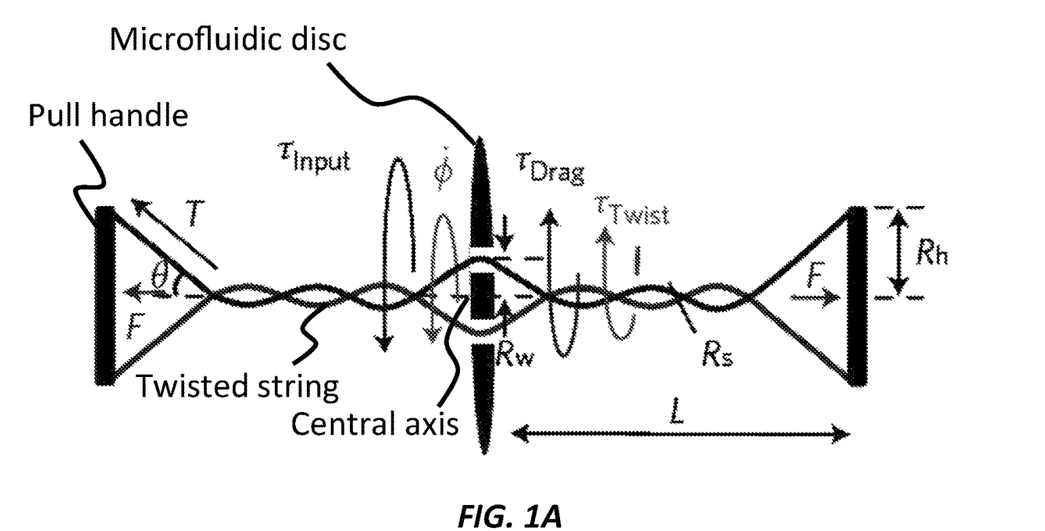
FIGS. 1A-1B show drawings of the microfluidic disc and the principles of operation, according to one embodiment of the invention.
Figure 1B:
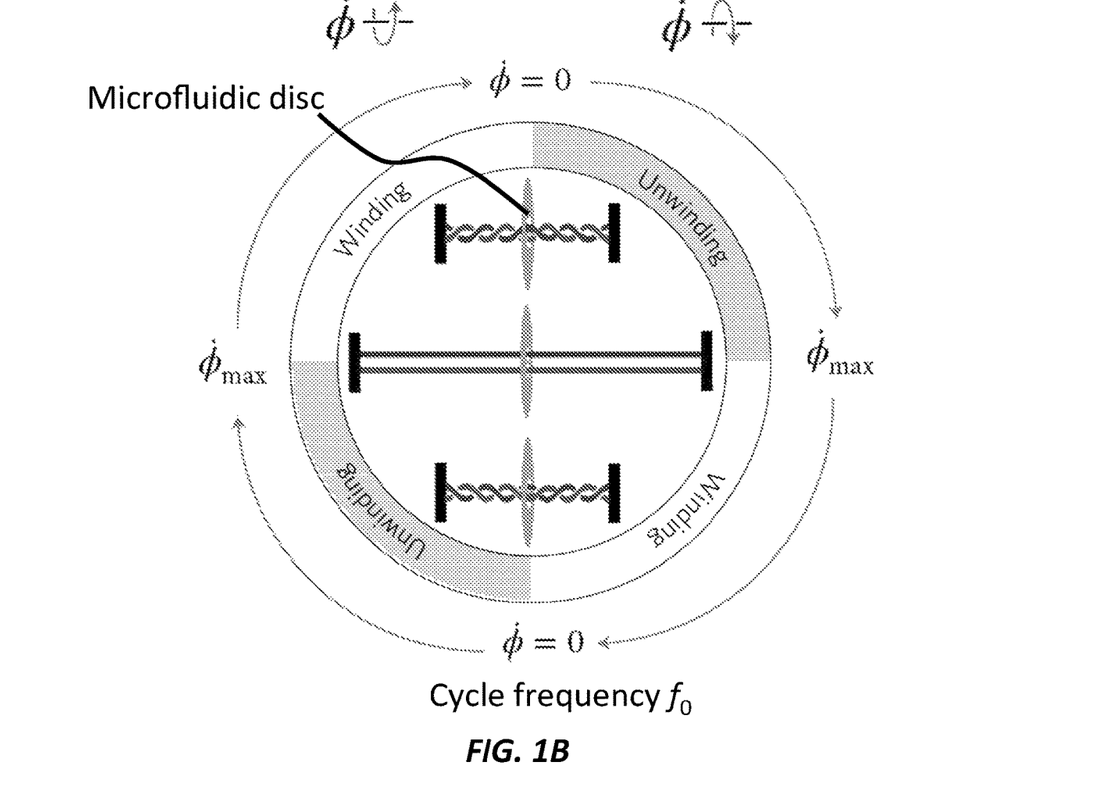
Figure 2A:
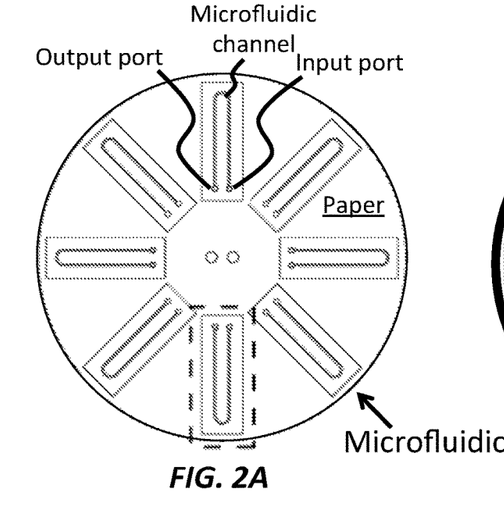
FIGS. 2A-2E show different configurations of the microfluidic channels, the input/output ports and the housing materials, according to embodiments of the invention.
Figure 2B:
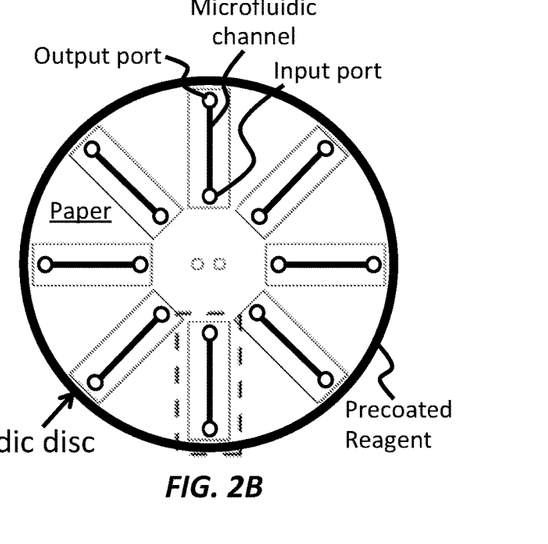
Figures 2C, 2D:
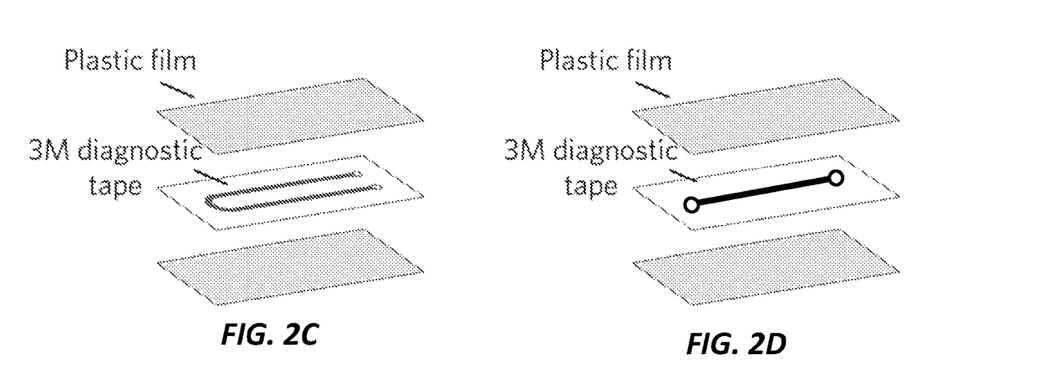
Figure 2E:
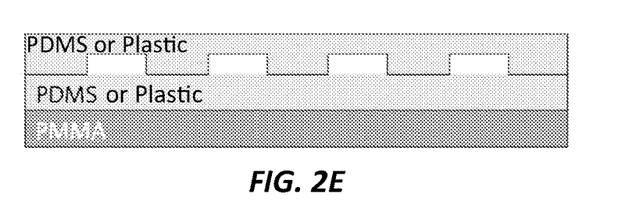
Figure 6:
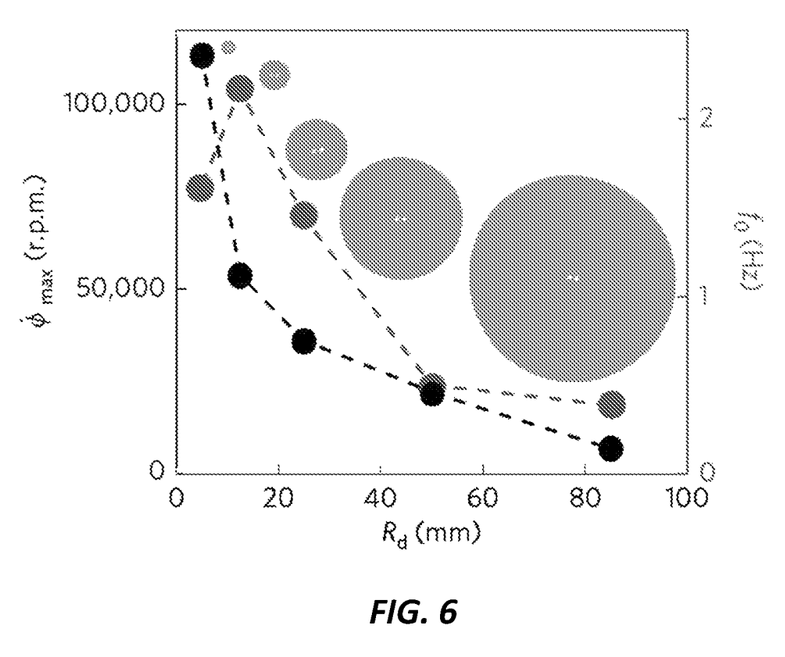
FIG. 6 shows a plot of $\dot{\phi}_{max}$ and $f_0$ for different hand-powered discs, with $R_d$ of 5, 12.5, 25, 50 and 85 mm, according to embodiments of the invention.

The actuation of the paperfuge includes successive 'unwinding' and 'winding' phases (FIGS. 1A-1B). In the unwinding phase, the outward input force (applied by human hands on the handles) accelerates the disc to a maximum rotational speed ($\dot{\phi}_{max}$). In the winding phase, the input force falls to zero, allowing the inertia of the disc to rewind the strings and draw the hands back inwards. Since the strings are flexible (low bending stiffness), they wind beyond the geometric zero-twist point, passing through a spectrum of helical twisting states. After reaching a tightly packed supercoiled state, the motion of the disc comes to a momentary halt. At this point, an outward force is re-applied, unwinding and winding the strings. This cycle repeats itself at a frequency $f_0$. The maximum rotational speeds of various paperfuge sizes, ranging over an order of magnitude (5 to 85 m), are shown in FIG. 6. The radius of the central disc strongly influences the maximum speed achieved. The smallest disc (Rd=5 mm) reached a $\dot{\phi}_{max}$ of 125,000 r.p.m. at $f_0$=2.2 Hz. It is worth noting that muscle force-velocity tradeoff constrains the fastest operable frequency at 2 Hz. In general, the paperfuge is a nonlinear, non-conservative oscillator device, where in every rotation cycle, the input energy is introduced by human hands (applied force) and is dissipated by the system through air drag and in the strings. Consider a massless, inextensible string with uniform tension throughout the string (FIG. 1C). Starting from an energy balance on the system, a governing equation of motion is derived that relates angular acceleration $\ddot{\phi}$ and different torque components as:

$$I\ddot{\phi} = \tau_{Input}(\phi) + \tau_{Drag}(\dot{\phi}) + \tau_{Twist}(\phi), \quad (1)$$

where I is the inertial moment of the disc, $\phi$ is the angular displacement, and $\tau_{Input}$, $\tau_{Drag}$ and $\tau_{Twist}$ are the input, air-drag and string twisting contributions to the torque, respectively. Each of the above terms can be derived from the geometrical parameters of the system.

Starting with the input torque, it is dependent on the applied pull force as $\tau_{Input}(\phi) = -\text{sgn}(\phi)2R_sF \tan \theta$, where $R_s$ is the radius of the string, F is the force applied by hand and $\theta$ is the angle subtended by the string from the axial axis of the paper disc. To evaluate $\tau_{Input}(\phi)$, the relationship between $\theta$ and $\phi$ must be found. By divided the twisting section of the string into three parts and obtaining a geometrical relationship between $\theta$ and $\phi$, where $\theta = \sin^{-1}(|\phi|R_s + R_h + R_w)/L)$, $R_h$ the handle radius, $2R_w$ the distance between the holes on the disc, and 4L the total length of the string are determined. This gives the formulation:

$$\tau_{Input} = -\text{sgn}(\phi)2R_sF \frac{|\phi|R_s + R_h + R_w}{\sqrt{L^2 - (|\phi|R_s + R_h + R_w)^2}} \quad (2)$$

Since the Reynolds number for the spinning disc is large (Re≈$10^5$), the component due to air drag as $F_{Drag}(\dot{\phi}) = -a_R S_d (R_d \dot{\phi})^2$ is calculated, where $a_R$ is the air-friction parameter, and $S_d$ is the surface element on the disc. Integrating over the total surface area of a paper disc of width w, the following expression for the drag torque is obtained:

$$\tau_{Drag}(\dot{\phi}) = -\text{sgn}(\dot{\phi})a_R\left(\frac{4\pi}{5}R_d^5 + 2\pi w R_d^4\right)\dot{\phi}^2 \quad (3)$$

The twisting term ($\tau_{Twist}$) accounts for many forces in the paperfuge dynamics that contribute to the string's resistance to twisting. Since the strings have low stiffness in both bending and torsion, they undergo twist far beyond the zero-twist point to form supercoiled structures. To account for this twist resistance, an empirical equation is defined, based on the following observations (1) at $\phi=0$, with no expected resistive torque on the disc from the string; (2) at $\phi_{crit}$, the string was at a geometric critical twist, and further compression was modelled as a linear spring force; and (3) $\phi$ could not exceed some maximum value $\phi_{max}$. Using these conditions, a function of the form is defined:

$$\tau_{Twist}(\phi) = -sgn(\phi)A\left[\frac{1}{(B-|\phi|)^{\gamma}} - C\right] \quad (4)$$

with a twisting parameter ($\gamma$), which was fitted using experimental data. The parameters A, B, and C were found using the three constraints described above, resulting in the complete expression:

$$\tau_{Twist}(\phi) = -sgn(\phi)\frac{1}{\gamma}(\phi_{max} - \phi_{crit})^{\gamma+1}\left[\frac{1}{(\phi_{max}-|\phi|)^{\gamma}} - \frac{1}{\phi_{max}^{\gamma}}\right] \quad (5)$$

Knowing the expression for the three torque terms, the differential equation (1) is numerically solved to quantify the dynamics of the paperfuge. Separating the individual contributions of the torque allowed one to see the three stages where each torque term dominated in the cycle. $\tau_{input}$ dominated during the unwinding phase, followed by $\tau_{Drag}$, which reached its maximum value at $\dot{\phi}_{max}$; $\tau_{Twist}$ increased drastically at the end of the winding phase $\dot{\phi}=0$, bringing the disc to a momentary halt, $\dot{\phi}=0$.

By simultaneously measuring applied force and rotational velocity, the two unknown parameters in the model are quantified: $a_R$ and $\gamma$. Using a high-speed camera ($f_{rec}=6,000$ f.p.s.) synchronized with a force transducer, a time-series of the force actuating the paperfuge is obtained. By using an input function for the force in the model (equation (1)), the dynamics of the paperfuge are accurately predicted. The predictive power of the model are further utilized to develop a design landscape, and compared this with the experimental data. The validity of the model is confirmed for paper discs in the following parameter design space: $R_d$=[5, 85] mm, F=[5, 50] N, $R_s$=[0.05, 0.5] mm, $w_d$=[0.3, 4.5] mm. The scaling curve predicts that 1,000,000 r.p.m. can be achieved at a frequency of oscillation of >10 Hz and nominal forces (50 N). The dependence of $\dot{\phi}_{max}$ and $f_0$ on different physical parameters is also highlighted, such as string radius and length, and disc radius and width.

With the validated model, the function of the paperfuge for centrifugation is optimized. Centrifuges are characterized by the relative centrifugal force (r.c.f.) they can generate, defined as r.c.f.=$R_d\dot{\phi}^2$/g, where g is the acceleration due to gravity. The paperfuge is an oscillatory centrifuge, which changes direction in a periodic manner. Thus, an effective r.c.f. is defined as $R_d\langle\dot{\phi}^2(t)\rangle$/g, which yields an r.c.f.$\approx$10,000 g for a paperfuge with $R_d$=50 mm.

Next, demonstrated herein is how the paperfuge can be utilized as a field-portable, ultralow-cost centrifugation tool. According to aspects of the invention, several safety measures are implemented to make the device usable in the field. Capillaries are filled with 20 µL of whole human blood (from a finger-prick) and spun on the paperfuge, revealing complete separation of plasma from the red blood cells (RBC) within 1.5 min. The volume fraction of RBCs provided a direct readout for haematocrit values (packed cell volume, PCV=0.43, at t=1.5 min), which is a measure used for diagnosing anemia. The haematocrit value obtained was in good agreement with control experiments conducted simultaneously on a commercial electric centrifuge. Furthermore, the resulting pure plasma could be easily retrieved for use with other rapid diagnostic tests.

Figure 3A:
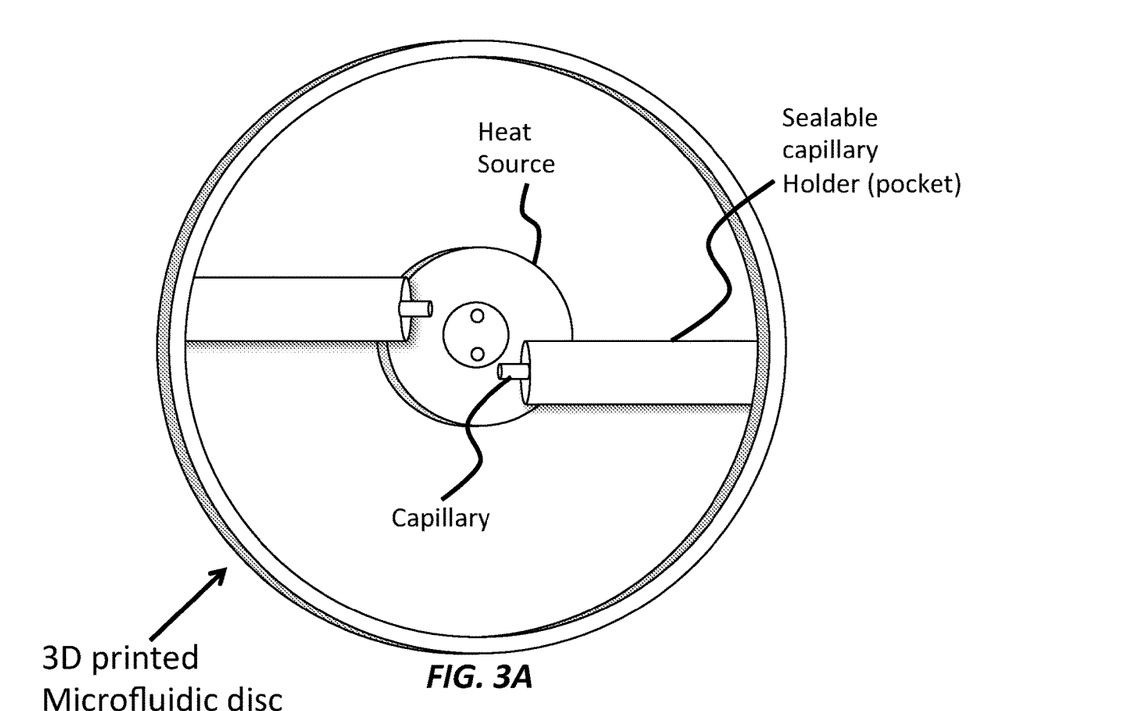
FIGS. 3A-3B show drawings of 3D printed microfluidic discs having capillary holders, according to embodiments of the invention.
Figure 3B:
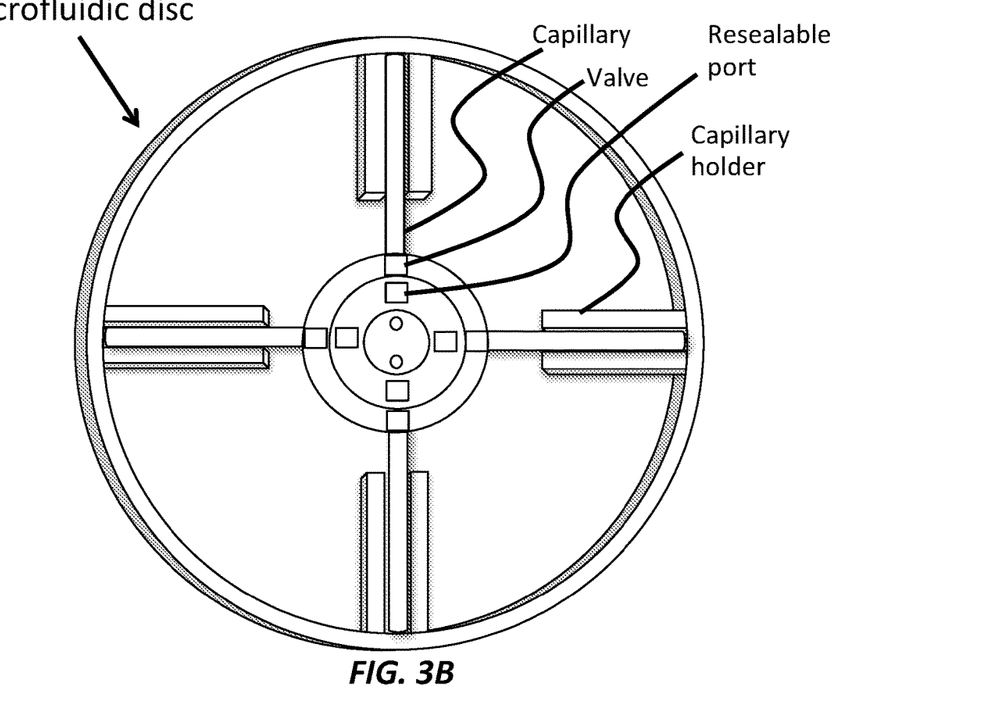
Figure 4:
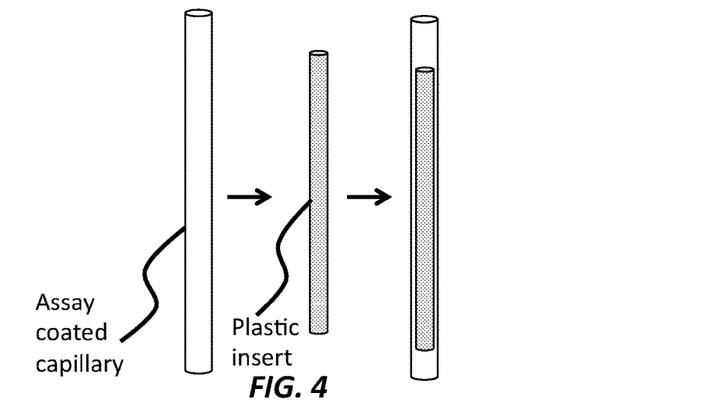
FIG. 4 shows drawings of a capillary with a plastic insert that can be used with the embodiments of FIGS. 3A-3B, according to embodiments of the invention.
Figure 5A:
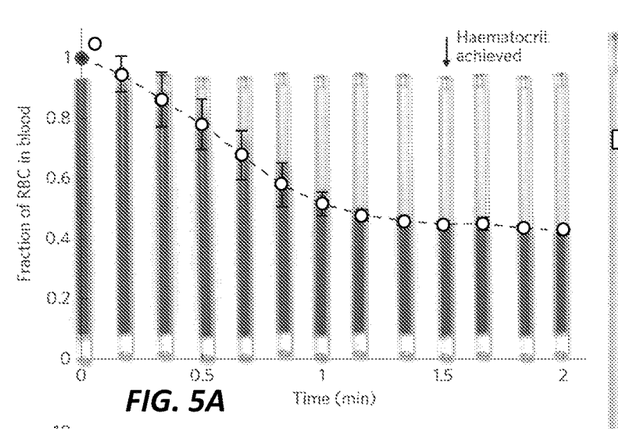
FIGS. 5A-5C show (5A) kinetics of red blood cells (RBC) and plasma from paperfuge separation, (5B) separation of 8 µl of blood plasma (per capillary) from whole blood occurred in less than 1.5 min, where the error bars in (5A) and (5B) represent the standard deviation calculated from eight independent trials conducted by two users, (5C) the quality of the plasma evaluated using microscopy, revealing 100% pure plasma; scale bars are 10 µm, according to embodiment of the invention.
Figure 5B:
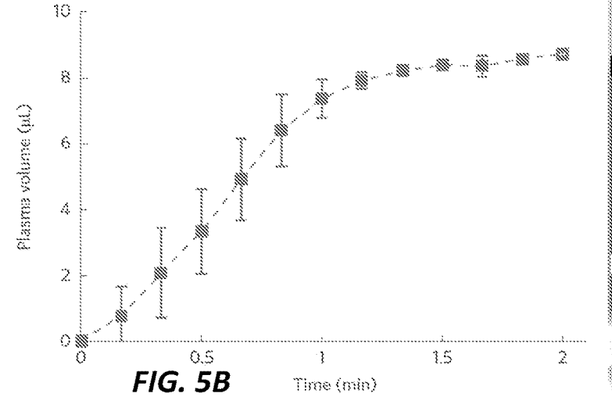
Figure 5C:
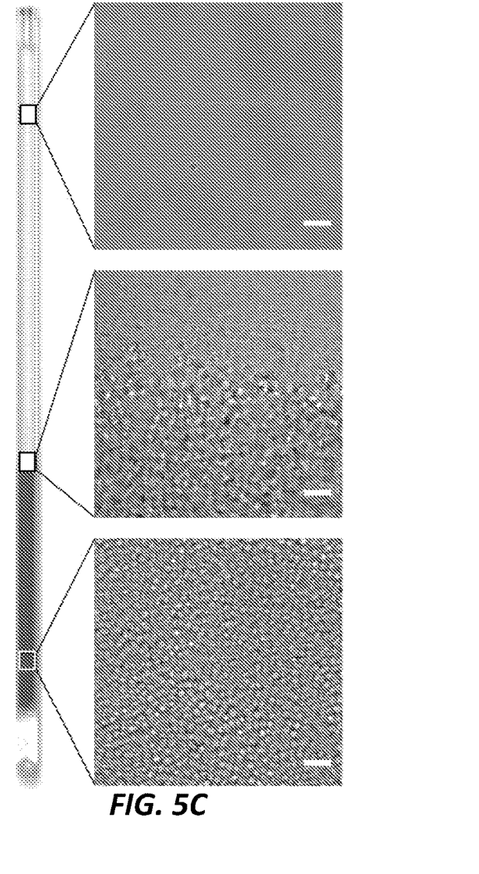

Finally, the breadth of possibilities and applications of the paperfuge platform is shown. Using a QBC capillary and float system, 15 min of spinning on a paperfuge can successfully separate the buffy coat (FIG. 4). This expanded region could be easily used for identification of haematoparasites for infectious diseases such as malaria and African trypanosomiasis using a microscope. A comparison of individual blood components, including platelets, monocytes and granulocytes, revealed good quantitative agreement between the buffy coat obtained with a paperfuge and a commercial electric centrifuge. The uncomplicatedness and robustness of the paperfuge device makes it possible to design and construct devices from materials beyond paper, including wood, plastic and polymers. For example, using a desktop 3D printer, lightweight (20 g) prototypes of different '3D-fuges' that spun at speeds of approximately 10,000 r.p.m. were rapidly printed, which opens up opportunities to mass-manufacture millions of centrifuges using injection-moulding techniques (see FIGS. 3A-3B). In one example a centrifugal microfluidics disc made from polydimethylsiloxane has been demonstrated, which enables one to design integrated lab-on-a-chip devices that do not require external pumps or electricity. Since soft lithography requires fabrication infrastructure, inexpensive plastic-tape microfluidics are enabled for integrating with the paperfuge. In one exemplary embodiment, two-dimensional plastic slides were assembled to demonstrated plasma isolation in 2 min, which could be further imaged under a microscope without perturbing the sample (FIGS. 5A-5C).

According to one aspect of the invention, the input port and the output port include resealable ports configured for adding or subtracting samples in multi-step processes.

In a further aspect of the invention, the microfluidics disk includes valves and pre-coated chemicals for further processing.

According to aspects of the current invention, the variety of materials (paper, polymers, etc.) and rich design landscape offer an electricity-free integrated POC device for healthcare needs worldwide. The choice of paper as a substrate further opens opportunities for incorporating origami-based geometries, embedding optics, paper-based microfluidics and ultimately integrated lateral-flow rapid diagnostic assays. Moreover, by exploiting the unique oscillatory dynamics of a paperfuge, new separation protocols are enabled that have been predicted theoretically, but not confirmed empirically. The ease of manufacturing of the device enables immediate mass distribution of a solution urgently needed in the field. Ultimately, the current invention serves as an example of frugal science: leveraging the complex physics of a simple toy for global health applications.

A prototype paperfuge was composed of two card-stock paper discs. Braided fishing line was used for the strings to provide high tensile strength. Common wood or PVC pipe was used for the handles, and drinking straws were used to create safe and easy mounting of the capillaries. The straws were sealed using epoxy to act as a secondary containment for accidental leakages from the capillaries. Here, two equal circle-shaped discs (Rd=50 mm) were printed on the paper using a laser printer. In the center of each disc, there were two small circular holes (diameter=3 mm), spaced 2.5 mm apart. To reduce wear at the point of contact with the paper, two 3-mm-thick, acrylic ovals (major axis=13 mm, minor axis=6 mm) were used with two small circular holes (diameter=3 mm), spaced 2.5 mm apart. These acrylic ovals were taped to the center of the outer face of each disc, such that the holes on the acrylic aligned with the holes on the discs. Two straws were cut down to 40-mm-long pieces. One end of each straw was sealed with a drop of epoxy and allowed to dry for at least 20 min at room temperature. The straws were glued at opposite edges of the inner face of one of the discs, with the epoxy-closed ends pointing outwards. Four Velcro pieces were placed at 90° from each other along the edges of the circular disc. String was threaded through the holes in the center of the discs and each end of the string was tied around a handle. The two discs were then attached to each other using Velcro, covering the straws. Sticking the two paper discs together using Velcro serves as a safety cover as well as creating a streamlined surface for reducing air drag. The paperfuge was spun by holding one handle in each hand.

In a further embodiment, the paperfuge includes three independent safety mechanisms to protect the user from accidental exposure to blood. First, the capillaries are made of shatter-proof plastic. Second, the capillaries are inserted into sealed straw holders that are able to contain accidental leaks. Further, the paperfuge has two discs held together using Velcro strips: one disc holds the straw capillary holders and one disc covers the straws. The cover serves as an additional safety measure to prevent blood exposure to the user.

In another exemplary embodiments (see FIGS. 2A-2D), a PDMS-fuge was fabricated using the soft lithography technique. First, SU-8 50 resist (MicroChem) was spin-coated on a wafer, followed by prebaking for 10 min, resulting in a 110-µm-thick layer. This was further baked for 30 min to densify the resist film. The resulting resist film was then exposed to ultraviolet light for 18 s, and post-baked for 10 min to selectively crosslink the exposed parts. Finally, the unexposed material was washed away with SU-8 developer to obtain the master mould. To fabricate the channels, a PDMS mixture of 20:1 base:curing agent was poured into the mould. A supporting PDMS/PMMA (polymethyl methacrylate)-based structure was also made by pouring a 5:1 base:curing agent mixture onto a circular PMMA disc (1.5 mm thick). Finally, both layers were bonded by incubation at 65° C. overnight. Each U-channel held up to approximately 10 µL of liquid.

Plastic-tape microfluidics provide a low-complexity, low-cost, disposable platform for centrifuging biological samples. In one embodiment, the slides were assembled using double-sided tape and thin plastic films. First, U-shaped channels were laser-printed onto two sheets of double-sided tape. Each side of the tape was then adhered to a thin plastic film and the entire microfluidic channel was clamped for 15 min to seal the sides of the channel. A drop of blood (approximately 10 µl) was applied to the top of the channel and capillary action drew the blood into the channel in a few seconds. These slides were then mounted on a paperfuge and spun normally. Alternatively, paper could be used as the channel layer, and single-sided tape could be used to seal from both sides.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A microfluidic centrifuge for diagnostics of bodily fluidic samples, comprising:
    a microfluidic disc having a pair of through holes comprising a first through hole and a second through hole, wherein the pair of through holes are disposed symmetric and proximal to a central axis of the microfluidic disc, wherein the microfluidic disc is at least partly made out of paper, or the microfluidic disc forms a housing, wherein the housing is at least partly made out of paper;
    one or more microfluidics channels on the surface of the microfluidic disc, wherein each of the one or more microfluidics channels has an input and an output;
    one or more sealable input ports and one or more sealable output ports, wherein each input of the one or more microfluidics channels is connected to one of the sealable input ports and each output of the one or more microfluidics channels is connected to one of the sealable output ports;
    a first tether and a second tether forming a pair of tethers, wherein the pair of tethers are continuously disposed through the pair of through holes with ends at each side of the microfluidic disc, wherein the pair of tethers are disposed to twist about each other for unwinding, wherein the tether unwinding is disposed to interact with the through holes, wherein the microfluidic disc rotates about the central axis causing a centrifugal force capable of acting on the bodily fluidic samples present in the one or more microfluidic channels.

2. The microfluidic centrifuge of claim 1, wherein each of the one or more sealable input ports are disposed proximal to the central axis and each of the one or more sealable output ports are disposed proximal to a perimeter of the microfluidic disc, wherein each of the one or more microfluidics channels have a linear-shape or a non-linear shape.

3. The microfluidic centrifuge of claim 1, wherein each of the one or more sealable input ports are disposed proximal to the central axis and each of the one or more sealable output ports are disposed proximal to the central axis forming U-shaped microfluidics channels.

4. The microfluidic centrifuge of claim 1, wherein the one or more microfluidics channels comprise a coating of an assay reagent.

5. The microfluidic centrifuge of claim 1, wherein a central region of the microfluidic disc comprises a heat source.

6. The microfluidic centrifuge of claim 1, further comprising one or more sealable capillary holders, wherein a capillary is configured for inserting into each of the one or more sealable capillary holders.

7. The microfluidic centrifuge of claim 6, wherein each of the one or more sealable capillary holders comprises a pocket for mounting the capillary, wherein the capillary comprises plastic or glass.

8. The microfluidic centrifuge of claim 6, wherein each of the one or more sealable capillary holders comprises a window for direct imaging by a microscope.

9. The microfluidic centrifuge of claim 1, wherein each of the one or more sealable input ports and each of the one or more sealable output ports comprise resealable ports configured for adding or subtracting samples in multi-step processes.

10. The microfluidics centrifuge of claim 1, wherein the microfluidics centrifuge does not require external pumps or electricity.

11. The microfluidics centrifuge of claim 1, wherein the microfluidics centrifuge is hand-powered.

* * * * *